United States Patent
Barrios et al.

(10) Patent No.: US 11,280,536 B2
(45) Date of Patent: Mar. 22, 2022

(54) TEMPERATURE CONTROL OF REFRIGERATION CAVITIES IN LOW AMBIENT TEMPERATURE CONDITIONS

(71) Applicant: Electrolux Home Products, Inc., Charlotte, NC (US)

(72) Inventors: Raony Barrios, Anderson, SC (US); Marco Rotondo, Anderson, SC (US); Dennis Schenk, Anderson, SC (US); Eduardo Alves Cardoso, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 502 days.

(21) Appl. No.: 15/764,576

(22) PCT Filed: Sep. 29, 2016

(86) PCT No.: PCT/US2016/054352
§ 371 (c)(1),
(2) Date: Mar. 29, 2018

(87) PCT Pub. No.: WO2017/059021
PCT Pub. Date: Apr. 6, 2017

(65) Prior Publication Data
US 2018/0299179 A1 Oct. 18, 2018

Related U.S. Application Data

(60) Provisional application No. 62/235,428, filed on Sep. 30, 2015.

(51) Int. Cl.
F25D 11/02 (2006.01)
F25D 29/00 (2006.01)

(52) U.S. Cl.
CPC .............. *F25D 11/02* (2013.01); *F25D 29/00* (2013.01); *F25D 29/005* (2013.01);
(Continued)

(58) Field of Classification Search
CPC .... F25D 11/02; F25D 29/005; F25D 2700/10; F25D 2600/06; F25D 29/00;
(Continued)

(56) References Cited

U.S. PATENT DOCUMENTS 4,197,717 A * 4/1980 Schumacher ......... F25D 21/002
62/213
4,292,813 A * 10/1981 Paddock .................. F25B 49/02
165/269

(Continued)

FOREIGN PATENT DOCUMENTS

DE 102011085959 5/2013
EP 0281317 A1 * 9/1988 ................ F25B 5/02

(Continued)

OTHER PUBLICATIONS

International Search Report for PCT/US2016/054352, dated Jan. 13, 2017, 2 pages.

*Primary Examiner* — Larry L Furdge
*Assistant Examiner* — Kirstin U Oswald
(74) *Attorney, Agent, or Firm* — Pearne & Gordon LLP (57) ABSTRACT

A method of controlling the temperature in cavities of a refrigerator (10) cooled by a refrigeration circuit having a compressor (18) and an evaporator (32) includes the steps of: monitoring the duty cycle of the compressor (18); determining whether the duty cycle is below a threshold; determining whether the temperature of the evaporator (32) is above a threshold; and if the duty cycle is below the threshold and if the evaporator temperature is above a threshold, activating the refrigeration circuit to start cooling (Continued)

of at least one of the refrigerator cavities. A refrigeration appliance (10) with a controller that activates the refrigeration circuit based on the monitored duty cycle of the compressor (18) and the evaporator temperature is also provided.

19 Claims, 5 Drawing Sheets

(52) U.S. Cl.
CPC ... *F25B 2500/31* (2013.01); *F25B 2600/0251* (2013.01); *F25D 2600/06* (2013.01); *F25D 2700/10* (2013.01); *Y02B 40/00* (2013.01)

(58) Field of Classification Search
CPC .................. F25D 21/002; F25D 21/02; F25B 2600/0251; F25B 2500/31; Y02B 40/32; Y02B 40/00
USPC ........................................................ 62/228.1
See application file for complete search history.

(56) References Cited

U.S. PATENT DOCUMENTS

| | | | | |
|---|---|---|---|---|
| 4,327,557 A * | 5/1982 | Clarke | ................. | F25D 21/006 62/153 |
| 4,460,123 A * | 7/1984 | Beverly | ................. | F23N 1/002 236/46 R |
| 4,467,617 A * | 8/1984 | Morgan, Jr. | ............ | F25D 17/06 62/158 |
| 4,481,784 A * | 11/1984 | Elmslie | ................ | B60H 1/3208 62/133 |
| 4,481,785 A * | 11/1984 | Tershak | ................ | F25D 21/006 62/153 |
| 4,481,787 A * | 11/1984 | Lynch | ..................... | F25D 11/02 62/180 |
| 4,528,821 A * | 7/1985 | Tershak | ................ | F25D 21/006 62/153 |
| 4,573,325 A * | 3/1986 | Chiu | ........................ | F25C 5/08 62/129 |
| 4,615,179 A * | 10/1986 | Chiu | .................... | F25D 21/006 62/129 |
| 4,732,010 A * | 3/1988 | Linstromberg | ....... | F25D 17/045 62/155 |
| 4,741,170 A * | 5/1988 | Tershak | ................ | F25D 17/045 62/127 |
| 4,800,729 A * | 1/1989 | Hara | ..................... | F25B 25/005 62/185 |
| 4,821,528 A * | 4/1989 | Tershak | ................ | F25D 17/045 62/126 |
| 4,834,169 A * | 5/1989 | Tershak | ................ | F25D 17/065 165/233 |
| 4,916,912 A * | 4/1990 | Levine | ................. | F25B 47/025 62/155 |
| 5,031,413 A * | 7/1991 | Tsuihiji | ................. | F25D 21/002 62/234 |
| 5,065,813 A * | 11/1991 | Berkeley | ............ | G05D 23/1917 236/94 |
| 5,187,941 A | 2/1993 | Tershak et al. | | |
| 5,275,012 A * | 1/1994 | Dage | ................. | B60H 1/00392 219/202 |
| 5,355,686 A * | 10/1994 | Weiss | .................... | F25D 17/065 62/158 |
| 5,375,428 A * | 12/1994 | LeClear | ................ | F25D 17/045 62/187 |
| 5,410,230 A * | 4/1995 | Bessler | ................. | H02P 6/085 318/471 |
| 5,415,005 A * | 5/1995 | Sterber | ................. | F25D 21/006 62/154 |
| 5,490,556 A * | 2/1996 | Pichotta | ............. | B60H 1/00828 165/255 |
| 5,524,444 A | 6/1996 | Gromala et al. | | |
| 5,842,355 A * | 12/1998 | Kalis | ..................... | F25D 17/062 62/234 |
| 5,899,083 A * | 5/1999 | Peterson | ................ | F25D 17/045 62/186 |
| 5,931,004 A * | 8/1999 | Yoo | ........................ | F25D 17/065 62/82 |
| 6,006,530 A * | 12/1999 | Lee | ......................... | F25D 29/00 62/187 |
| 6,223,817 B1 * | 5/2001 | Oden | ...................... | F25D 29/00 165/232 |
| 6,427,772 B1 * | 8/2002 | Oden | .................... | F25D 21/006 165/11.1 |
| 6,438,978 B1 * | 8/2002 | Bessler | ................... | F25D 29/00 62/179 |
| 6,483,695 B1 * | 11/2002 | Hartstein | .............. | F25D 29/005 361/679.09 |
| 6,725,680 B1 * | 4/2004 | Schenk | ................... | F25D 11/02 62/186 |
| 6,782,706 B2 * | 8/2004 | Holmes | ................... | F25D 29/00 62/229 |
| 6,868,685 B2 * | 3/2005 | Kim | ......................... | F24F 11/83 62/228.1 |
| 6,889,511 B2 | 5/2005 | Jung | | |
| 7,000,422 B2 * | 2/2006 | Street | ........................ | F25B 1/00 62/298 |
| 7,337,620 B2 * | 3/2008 | Coulter | ................... | F25D 11/02 62/137 |
| 7,886,983 B2 * | 2/2011 | Criss | ....................... | F24F 13/22 236/44 C |
| 7,891,198 B2 * | 2/2011 | Wetekamp | ............ | F25D 17/065 62/66 |
| 8,417,386 B2 * | 4/2013 | Douglas | ................. | F25B 47/02 700/276 |
| 8,528,353 B2 * | 9/2013 | Sung | ..................... | F25B 49/025 62/228.1 |
| 8,596,082 B2 * | 12/2013 | Sung | ..................... | F25B 49/025 62/228.4 |
| 8,726,680 B2 * | 5/2014 | Schenk | ................... | F25B 49/025 62/228.4 |
| 8,966,926 B2 * | 3/2015 | Eveland | .................. | F25C 5/22 62/377 |
| 9,223,325 B2 * | 12/2015 | Hensley | .................. | G06F 1/206 |
| 9,376,954 B2 * | 6/2016 | Noll | ....................... | F01P 7/042 |
| 9,528,717 B2 * | 12/2016 | Childs | ..................... | F24F 11/83 |
| 9,920,967 B2 * | 3/2018 | Ushijima | ................ | F25B 13/00 |
| 10,066,849 B2 * | 9/2018 | Lau | ......................... | F24F 11/76 |
| 10,215,436 B1 * | 2/2019 | Rawski | ................... | F24F 11/86 |
| 2003/0182958 A1 * | 10/2003 | Gray | ..................... | F25D 17/065 62/229 |
| 2004/0083029 A1 * | 4/2004 | Bicknell | ............ | G05D 23/1931 700/276 |
| 2004/0107727 A1 * | 6/2004 | Kim | ......................... | F25B 5/04 62/525 |
| 2005/0039472 A1 * | 2/2005 | Cushman | ............... | F25D 17/045 62/187 |
| 2005/0086952 A1 * | 4/2005 | Nonaka | ................... | F25D 11/022 62/129 |
| 2005/0183429 A1 * | 8/2005 | Rafalovich | ............ | F25D 21/04 62/155 |
| 2007/0012054 A1 * | 1/2007 | Schenk | ................... | F25B 49/025 62/208 |
| 2007/0012055 A1 * | 1/2007 | Schenk | ................... | F25B 49/025 62/208 |
| 2007/0137227 A1 * | 6/2007 | Konopa | ................... | F25D 17/042 62/186 |
| 2008/0245085 A1 * | 10/2008 | Jaffer | ..................... | F25D 29/00 62/228.1 |
| 2011/0088415 A1 * | 4/2011 | Lacey | ..................... | F25B 47/02 62/80 |
| 2012/0318015 A1 * | 12/2012 | Motegi | ................... | B60H 1/3208 62/230 |
| 2013/0061620 A1 * | 3/2013 | Li | ............................ | F25B 5/02 62/126 |
| 2013/0166075 A1 * | 6/2013 | Castillo | ................... | F24F 11/30 700/277 |

(56) References Cited

U.S. PATENT DOCUMENTS

2013/0305756 A1* 11/2013 Gomes .................. F25B 49/02
                                                                                                62/126
2016/0258673 A1* 9/2016 Apaydin ............... F25D 11/022
2017/0191733 A1* 7/2017 Li ......................... F25D 21/008

FOREIGN PATENT DOCUMENTS

| EP | 0836065 | | 4/1998 |
| EP | 0836065 A2 | * | 4/1998 |
| JP | 2000213847 A | * | 8/2000 |
| JP | 2006052149 A | * | 2/2006 |
| WO | 2004015342 | | 2/2004 |

* cited by examiner

TEMPERATURE CONTROL OF REFRIGERATION CAVITIES IN LOW AMBIENT TEMPERATURE CONDITIONS

CROSS-REFERENCE TO RELATED APPLICATIONS

This application claims the benefit of U.S. Provisional Patent Application Ser. No. 62/235,428 entitled "TEMPERATURE CONTROL OF REFRIGERATION CAVITIES IN LOW AMBIENT TEMPERATURE CONDITIONS" which was filed Sep. 30, 2015. The entirety of the aforementioned application is herein incorporated by reference.

FIELD OF INVENTION

The following description relates generally to a refrigeration appliance with multiple refrigeration compartments, and more specifically to temperature control of the refrigeration compartments in low ambient conditions.

BACKGROUND OF INVENTION

Refrigeration appliances, such as domestic refrigerators, are provided with a cooling/refrigeration system for the purpose of generating and dispersing cold air into the refrigeration cavities. A typical refrigerator includes a freezer compartment that operates at a temperature below freezing and a fresh-food compartment that operates at a temperature between the ambient temperature (that is, the temperature in the space outside the refrigerator cabinet) and freezing. A damper or baffle can be provided to control air flow between the freezer compartment and the fresh-food compartment. A dual-cavity refrigeration appliance often uses the temperature of the fresh-food compartment to determine when the cooling system should be switched ON or OFF. However, when the ambient temperature is low, for example, between 34 F and 50 F, the temperature of the fresh-food compartment will also be low and the cooling system might never turn ON, which can cause the freezer compartment to warm up to the ambient temperature, resulting in undesired freezer thaw. In addition, in low ambient temperatures, due to air leakage between the refrigerator compartments, cold air from the freezer compartment might cause the fresh-food compartment (and items stored therein) to cool down below the freezing point. Therefore, it is desirable to provide a temperature control method that addresses these problems.

SUMMARY

The present invention provides a method of controlling temperature in refrigeration cavities.

In one general aspect, a method of controlling the temperature in cavities of a refrigerator includes the steps of monitoring the duty cycle of the compressor and the temperature of the evaporator. The method further includes the step of determining whether the duty cycle is below a duty cycle threshold. The method also includes the step of determining whether the temperature of the evaporator is above a temperature threshold. If the duty cycle is below the duty cycle threshold and if the evaporator temperature is above the temperature threshold, the method activates the refrigeration circuit to effect cooling of at least one of the cavities.

In another general aspect, a method of controlling the temperature in cavities of a refrigerator includes the steps of monitoring the duty cycle of the compressor and determining whether the duty cycle is below a threshold. If the duty cycle is not below the threshold, the method determines whether the whether the compressor has been off for a set period of time. If the whether the compressor has been off for a set period of time, the method activates the refrigeration circuit to effect cooling of at least one of the cavities.

In another general aspect, the step of activating the refrigeration circuit includes operating the compressor for a first specified time; heating at least one of the cavities for a second specified time; idling the refrigeration circuit for a third specified time; determining whether a controller of the refrigerator indicates that a defrost operation should commence; and if the defrost operation should not commence, repeating the steps of operating, heating, and idling.

Other features and aspects may be apparent from the following detailed description, the drawings, and the claims.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments that incorporate one or more aspects of the apparatus and methodology are described and illustrated in the drawings. These illustrated examples are not intended to be a limitation on the present disclosure. For example, one or more aspects of the disclosed embodiments can be utilized in other embodiments and even other types of devices. Moreover, certain terminology is used herein for convenience only and is not to be taken as a limitation.

Figure 1:
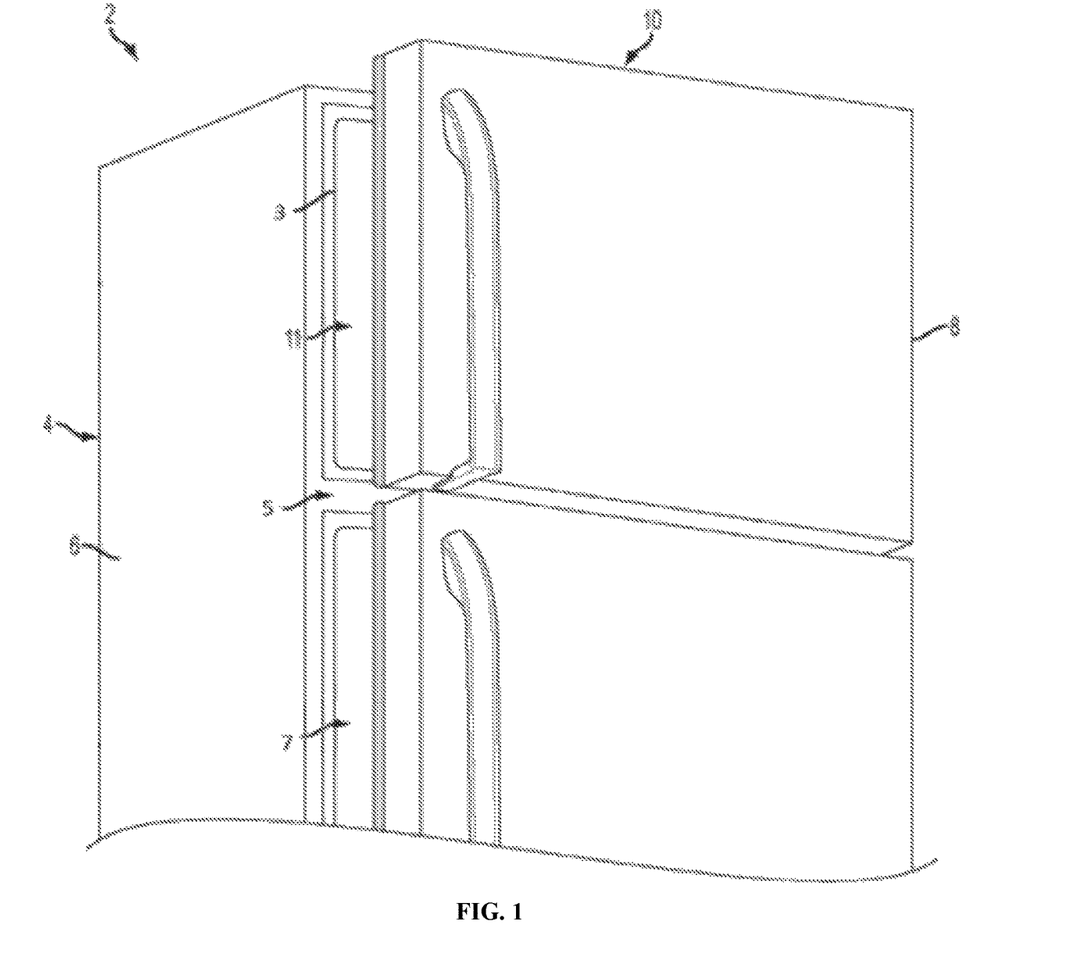
FIG. 1 is a perspective view of a top mount refrigerator.

Turning to the shown example of FIG. 1, a refrigeration appliance in the form of a refrigerator 2 is illustrated as a top-mount refrigerator with freezer and fresh-food compartments. Although some embodiments described in detail below, and shown in the figures as a top-mount configuration of a refrigerator with a fresh-food compartment and a freezer compartment, the refrigerator can have any desired configuration including at least one compartment for storing food items, at least one door for closing the compartment(s), and a condenser/cooling system configured to remove heat energy from the compartment(s) to the outside environment, without departing from the scope of the present invention.

The arrangement of the fresh-food and freezer compartments with respect to one another in such refrigerators can vary. For example, in some cases, the freezer compartment is located above the fresh-food compartment (i.e., a top mount refrigerator), and in other cases the freezer compartment is located below the fresh-food compartment (i.e. a bottom mount refrigerator). Additionally, many modern refrigerators have their freezer compartments and fresh-food compartments arranged in a side-by-side relationship. Whatever arrangement of the freezer compartment and the fresh-food compartment is employed, typically, separate access doors are provided for the refrigerated compartments so that either compartment may be accessed without exposing the other compartment to the ambient air. For example, a door provides access to the freezer compartment, and a door provides access to the fresh-food compartment of the refrigerator. While the present application is described herein by way of an example top mount refrigerator configuration, it is contemplated that any refrigerator configuration can be used, such as bottom-mount refrigerators having at least one door.

Referring to FIG. 1, an insulated cabinet constructed in accordance with the present invention is generally indicated at 2. The cabinet 2 includes a cabinet shell 4 defined at least in part by first and second upstanding side panels 6 and 8 that are interconnected and laterally spaced by a top panel 10. Although not shown in this figure, cabinet shell 4 would also include a rear panel and internal reinforcing structure. A liner 3 inside the shell can define spaces. Foam insulation may be used between the cabinet shell 4 and the liner 3. Since the refrigerator cabinet 2 represents a top mount-type refrigerator, a divider portion 5 is provided which extends laterally across shell 4 and divides refrigerator cabinet 2 into an upper space that can be used as a freezer compartment 11, and a lower space that can be used as a fresh-food compartment 7. Alternatively, the divider portion 5 can divide the refrigerator cabinet 2 into an upper fresh-food compartment, and a lower freezer compartment.

The amount of air that flows between the cavities is often controlled with a mechanical baffle or damper (not shown in FIG. 1). For example, the damper can be provided in the divider portion 5 to regulate the air flow between the freezer compartment 11 and the fresh-food compartment 7. The opening and closing of the damper can be controlled by any type of motor known in the art, such as a stepper motor, for example. The position of the damper can be set to any position between a fully closed position and a fully open position. For example, when the fresh-food compartment 7 temperature is above a predetermined fresh-food compartment upper temperature limit, the damper can be set to the full open position to provide the fastest cooling time to the fresh-food compartment 7. In contrast, the damper can be set to the full closed position when the fresh-food compartment 7 temperature is below a predetermined fresh-food compartment lower temperature limit to provide a slower cooling time to the fresh-food compartment 7. Further, if the fresh-food compartment temperature is between the fresh-food compartment upper and lower temperature limits, the damper can be set to a position between the full open and full closed position to thereby maintain the fresh-food compartment 7 at a constant temperature.

Negative temperature coefficient (NTC) thermistors, such as a fresh-food compartment temperature sensor 56 and a freezer temperature sensor 58 (not illustrated in FIG. 1, but discussed with reference to FIG. 4 below) can be provided inside the fresh-food compartment 7 and the freezer compartment 11 for sensing the fresh-food compartment temperature and the freezer compartment temperature, respectively. In some embodiments, however, the control method described herein may operate without a freezer temperature sensor and/or without a fresh-food compartment temperature sensor.

The cooling/refrigeration system of a refrigerator cools the storage compartments (e.g., the freezer and/or fresh-food compartment) of the refrigerator. The refrigeration system can include either a standard compressor or a variable speed compressor, a condenser, a condenser fan, an evaporator connected in series and charged with a refrigerant, and an evaporator fan. The evaporator fan circulates cooling air through the refrigerator compartments and improves heat transfer efficiency.

Figure 2:
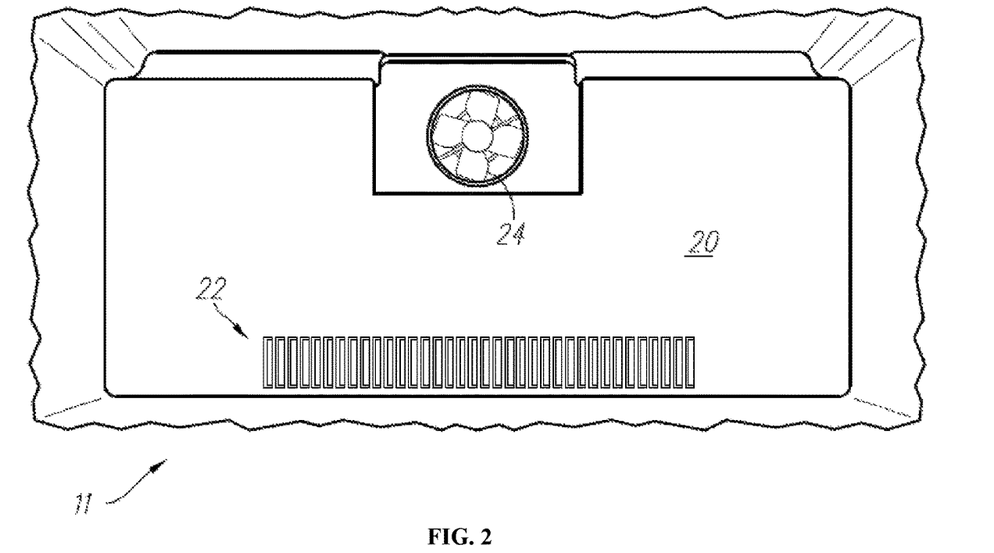
FIG. 2 is a perspective view of an evaporator assembly.

FIG. 2 is a perspective view of an example evaporator that can be located within the refrigerator 10, such as within the freezer compartment 11, for cooling the freezer compartment 11 and/or the fresh-food compartment 7. It is to be appreciated that the evaporator could be located in the fresh-food compartment 7, and further that the freezer and fresh-food compartments could have separate, dedicated evaporators.

The evaporator is located behind a panel 20 and, therefore, is not shown in FIG. 2. Via a vent 22, a fan 24 moves air from the freezer compartment 11 across the evaporator to cool the air, and discharges the cooled air back into the freezer compartment 11.

Figure 3:
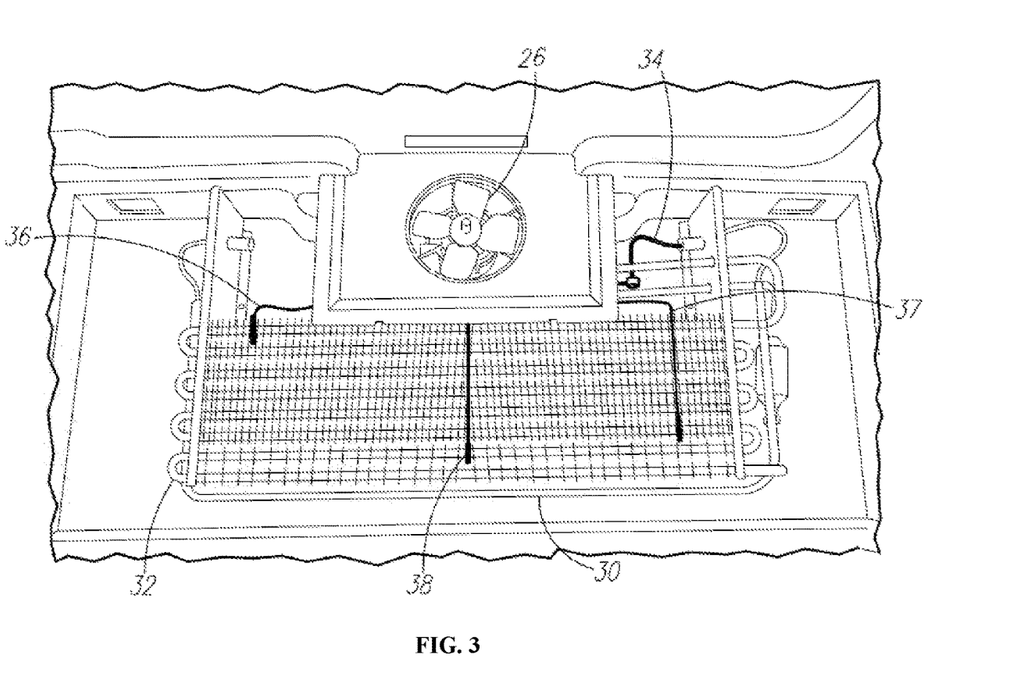
FIG. 3 is a perspective view of an evaporator assembly.

FIG. 3 is a perspective view of the evaporator assembly with the panel 20 removed. A defrost heater 30 can be mounted near the evaporator 32 for removing ice from the evaporator. The defrost heater 30 shown in FIG. 3 can surround the evaporator 32 on three sides. However, the defrost heater 30 could be mounted in other positions relative to the evaporator 32, such as behind the evaporator, directly on the evaporator, etc.

The defrost heater 30 can be operated periodically, such as every 8 hours, every 10 hours, etc. to defrost the evaporator 32. The defrost heater can be operated periodically with a fixed period between defrosting cycles that does not change. Alternatively, the defrost heater can be operated according to an "adaptive defrost" scheme in which the period between defrosting cycles is dynamically changed by a controller based on the time required to complete the most recent defrosting operation. The defrost heater could further be operated based on sensing a build-up of ice on the evaporator 32.

Temperature sensors 36, 37, 38 (e.g., thermocouple, RTD, negative temperature coefficient (NTC) thermistors, etc.) can be located on or near the evaporator 32 for sensing the temperature of the evaporator 32. The temperature sensors 36, 37, 38 generate respective temperature signals based on the evaporator temperature. Although three temperature sensors 36, 37, 38 are shown in FIG. 3, it is to be appreciated that any number of temperature sensors can be used as desired, such as one temperature sensor, two temperature sensors, four temperature sensors, etc. The evaporator 32 can have various "cold spots" that are the last spots on the evaporator to be defrosted, and it might be desirable to locate temperature sensors at such cold spots to help determine when the evaporator is completely defrosted.

As mentioned above, a dual cavity refrigeration appliance often uses the temperature of the fresh-food compartment to control the temperature in both refrigeration cavities. In electronically controlled refrigerators, the desired temperature for each compartment is user-selected by means of freezer and fresh-food compartment set point potentiometers, which may be disposed within the fresh-food compartment, for example. A control board reads the fresh-food compartment temperature using a thermistor and controls the cooling system using upper control limits (UCL) and lower control limits (LCL), which are temperature offsets from a predetermined set point provided by the user. For example, a typical temperature range for the fresh-food compartment is between 33 F and 46 F and a typical temperature range for the freezer compartment is between −6 F and 12 F.

However, there are instances when the ambient temperature (that is, the temperature in the space around the outside of the refrigerator cabinet) may fall below the UCL. For example, temperature ranges between 34 F and 50 F are considered low ambient conditions. In these situations, the compressor might never turn on if is operating in a normal running mode, which can cause the freezer to warm up to the ambient temperature, resulting in freezer thaw. Similarly, because of air leakage and/or in a system having no damper between the compartments or if the damper is not fully closed, after a certain number of low ambient freezer control cycles, cold air from the freezer compartment might cause the fresh-food compartment (and food in the fresh-food compartment) to cool down below the LCL, or even below the freezing point.

To address these problems, existing solutions use external heating elements, external temperature sensors, and/or electronic dampers. All of these solutions are complex and costly.

The temperature control method described below uses a low ambient control algorithm, which addresses the problem of freezer thaw in low ambient conditions and also inhibits the fresh-food compartment from freezing.

The cooling of the compartments can be controlled by a discrete digital logic or a controller, for example, in accordance with outputs from sensors that are positioned to sense the average temperatures within the freezer and fresh-food compartments 11, 7, respectively. The desired temperature for each compartment can be selected by the user using a freezer and fresh-food compartment temperature selectors, which may be disposed within the fresh-food compartment 7.

Figure 4:
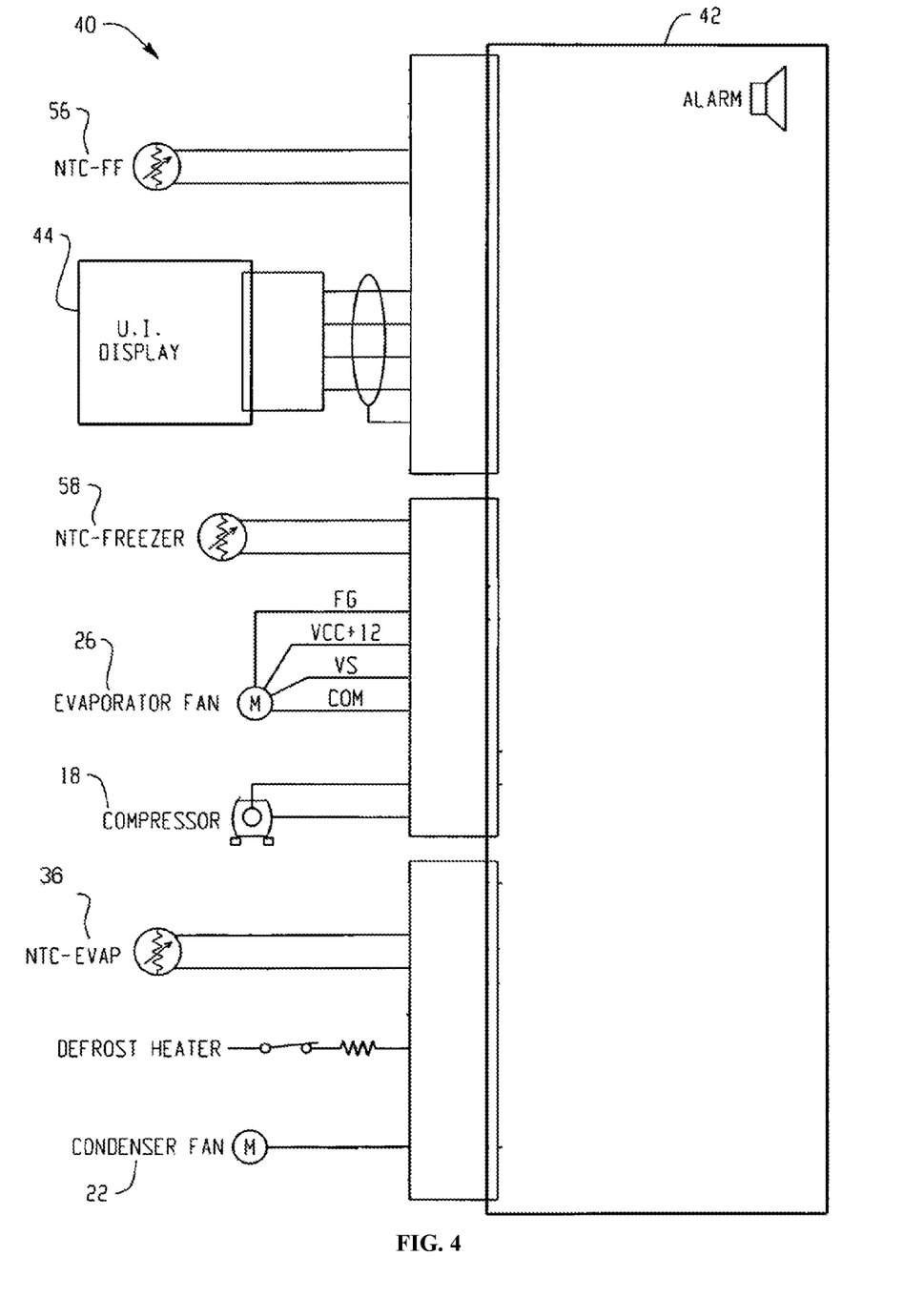
FIG. 4 is a schematic diagram of an electronic control system.

Referring to FIG. 4, the refrigerator 10 can further include an electronic microprocessor-based control system 40 for controlling the refrigeration components, such as the compressor 18, the condenser 20 and condenser fan 22, the evaporator 32 and evaporator fan 26, as well as non-refrigeration components, such as a user interface, indicator lights, alarms, etc. The control system 40 may include a main control board or controller 42 and a user interface/display board 44.

The controller 42 can be an electronic controller and may include a processor. The controller 42 can include one or more of a microprocessor, a microcontroller, a digital signal processor (DSP), an application specific integrated circuit (ASIC), a field-programmable gate array (FPGA), discrete logic circuitry, or the like. The controller 42 can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The controller 42 can further include one or more analog-to-digital (A/D) converters for processing various analog inputs to the controller. The controller 42 can be a dedicated controller that is used substantially only for controlling the temperature of the refrigeration compartments, or the controller can control a plurality of functions commonly associated with a refrigeration appliance, such as activating the compressor and the condenser fan, defrosting operations, and the like.

The user interface/display board 44 can communicate with the main control board 42 and can include communication means in the form of multiple control switches of any type known in the art to allow the user to communicate with the main control board 42. The user interface/display board 44 can further include a display portion for conveying information to the user. The display portion may be any type of display known in the art, such as a two-digit, 7-segment display that displays temperature either in degrees Fahrenheit or Centigrade or a single-digit, 7-segment display that displays a temperature setting from 1 to 9.

The controller 42 can include input/output circuitry for interfacing with the various system components. For example, the controller 42 can receive and interpret temperature signals from sensors 36, 37, 38, 56, and 58, and processes these signals to control the operation of the refrigeration and non-refrigeration components described above based on these signals. Specifically, inputs to the controller 42 can be provided from the freezer and the fresh-food compartment temperature sensors 56, 58, from at least one of the evaporator sensor(s) 36, 37, 37, from the user interface 44, and from the compressor 18. Outputs from the controller 42 can control at least the energization of the compressor 18, the evaporator fan 26, and the condenser fan 22. The controller 42 can be connected to output alarm devices, such as light emitting elements or sound emitting elements. The controller 42 can also initiate regular defrost operations at standard intervals, which may be stored in the memory of the controller 42 to be selected according to operating conditions of the refrigeration system.

The controller 42 drives the compressor 18 and the evaporator fan 26 based on the temperature detected from the sensor 56 located in the fresh-food compartment 7 and the temperature set by the user. That is, the controller 42 drives the compressor 18 and the evaporator fan 26 until inner temperature of the fresh-food compartment 7 reaches the temperature set by the user.

When the temperature outside the refrigerator surroundings is low (for example, if the refrigerator is placed in a garage or other unheated environment), the internal temperature of the fresh-food compartment may be similar or equal to the ambient temperature of the refrigerator. Because the temperature of the fresh-food compartment may be lower than the temperature pre-set by the user, the controller 42 will stop the compressor 18 and the evaporator fan 26, and the compressor will be OFF. However, when the temperature in the fresh-food compartment is used to control the temperature of the freezing compartment and when the temperature in the fresh-food compartment is low due to low ambient conditions, the temperature of the freezing compartment will undesirably increase above the temperature of the freezing compartment pre-set by the user and damage food or other items that may be stored in the freezing compartment.

Accordingly, to prevent temperature of the freezing chamber from being increased, the controller 42 infers (e.g., senses indirectly, without communicating with an ambient temperature sensor) the ambient temperature by monitoring the average compressor duty cycle [Time ON/(Time ON+Time OFF)] for the three most recent consecutive compressor cycles. That is, the controller 42 calculates the average duty cycle of the compressor by dividing the time the compressor operates (e.g., Time ON) by the sum of the time the compressor operates and the time the compressor does not operate (e.g., Time ON+Time OFF). Based on the average compressor duty cycle, the controller 42 executes a low ambient mode control algorithm in several situations.

First, if the Duty Cycle Average for the three most recent cycles of the compressor is below a specific threshold (for example 10%) and if the evaporator's negative temperature coefficient sensor (NTC) temperature is above a specific temperature threshold (for example, 14 F) while the compressor is OFF, the controller 42 will execute a low ambient mode control algorithm. In some embodiments, as an alternative or in addition to using the evaporator's negative temperature coefficient sensor (NTC) temperature, the temperature of the fresh-food compartment and/or the freezer compartment may be compared to predetermined threshold (s).

Second, if the Compressor Average Duty Cycle is below the same threshold (10%), and if the evaporator thermistor is damaged and no reliable temperature can be read, (for example short circuit or open circuit), and if the compressor has been turned OFF for a particular amount of time (for example, 180 minutes), the controller 42 will execute a low ambient mode control algorithm.

Third, if the compressor has been OFF for more than a runway timeout (for example, 3 hours), (for example, if the ambient temperature is dropping faster than the average duty cycle calculation during a cold night), the controller 42 will execute a low ambient mode control algorithm.

In response to any of the above detected situations, two different control algorithms can be used during low ambient conditions.

The first algorithm executed by the controller 42 is a low ambient freezer cooling control. As illustrated in the flowchart in FIG. 5, the process begins in Step 102, in which the controller 42 calculates the Compressor Duty Cycle Average for the three most recent cycles of the compressor by dividing the time the compressor operates (e.g., Time ON) by the sum of the time the compressor operates and the time the compressor does not operate (e.g., Time ON+Time OFF). If the Duty Cycle Average for the three most recent cycles of the compressor is below a specific threshold (for example 10%), in Step 104, the controller 42 checks if the evaporator's temperature sensor has failed. For example, the controller 42 may determine that the evaporator's temperature sensor has failed if no input (or no updated input) from the evaporator temperature sensor 36 has been received for a certain time period. If the evaporator's temperature sensor has not failed, in Step 106, the controller 42 checks if the temperature of the evaporator's temperature sensor is above a specific temperature threshold (for example 14 F), while the compressor is OFF. In Step 108, if the temperature of the evaporator's temperature sensor is above a specific temperature threshold (for example 14 F), while the compressor is OFF, the controller 42 will switch the compressor ON and will keep the evaporator fan OFF for a fixed period of time. This will ensure that the freezer compartment is kept cold and the fresh-food compartment does not cool down at the same rate as the freezer compartment, e.g. below the LCL or below the freezing point, because of the evaporator fan being OFF. Specifically, because in Step 108 the evaporator fan is OFF, cool air from the freezer compartment will not be circulated by the evaporator fan 26 to the fresh-food compartment 7. The controller 42 can also be configured to control the opening of a damper or a baffle that may be provided to control air flow between the freezer compartment 11 and the fresh-food compartment 7. The evaporator fan 26 will remain turned OFF until the temperature of the fresh-food compartment 7 exceeds a predetermined temperature (for example, the UCL) in Step 112, as described below.

Figure 5:
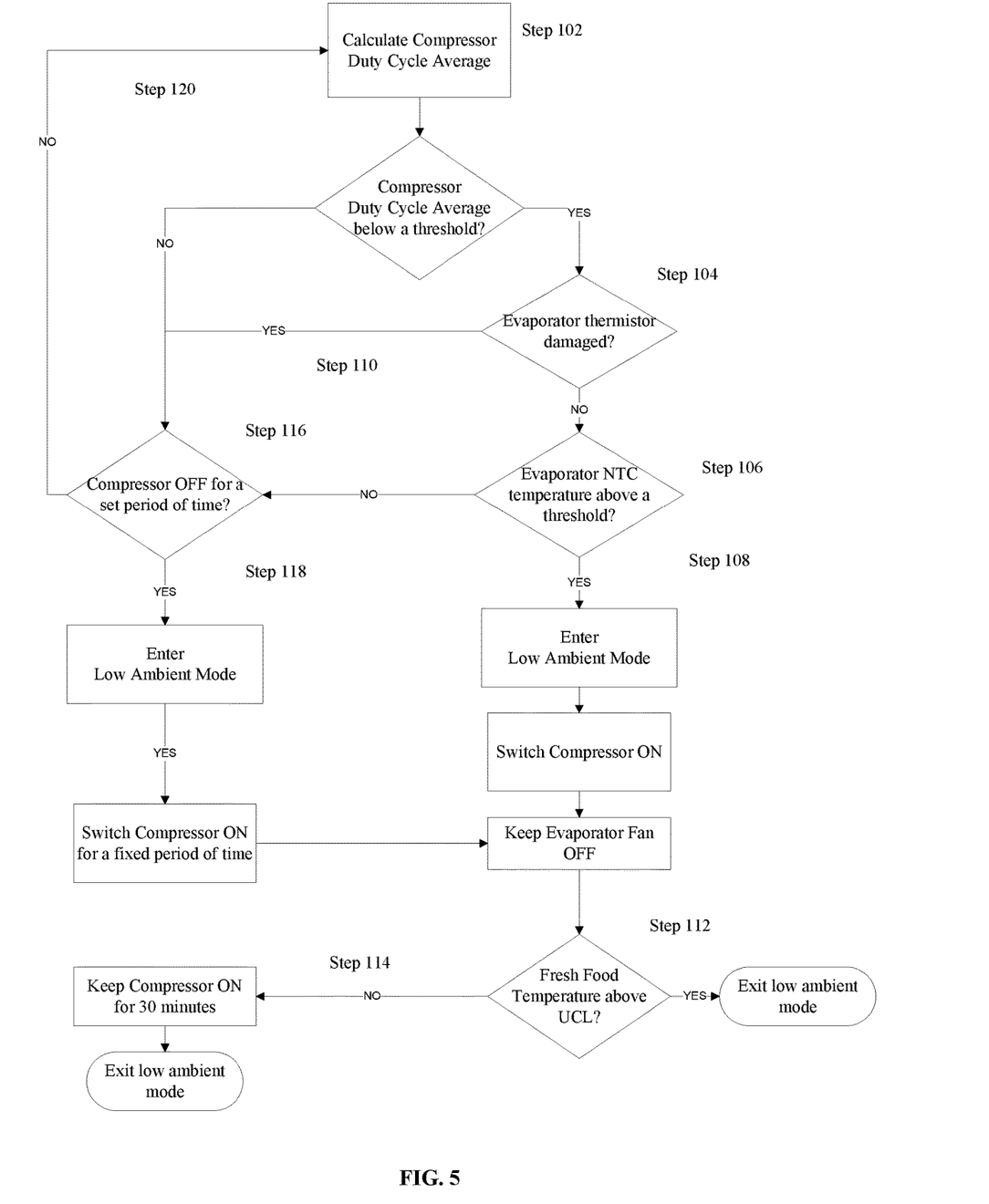
FIG. 5 is a flowchart illustrating a first low ambient freezer cooling control method.

If the evaporator's temperature sensor has failed (Step 110), the controller 42 will check whether the compressor has been OFF for a fixed period of time (Step 116). If the compressor stays OFF for more than the compressor runway timeout (for example, 3 hours), in Step 110, the controller 42 will check whether the compressor has been OFF for a set period of time. If the compressor has been OFF for a set period of time (Step 118), the controller 42 will enter a low ambient mode and will turn the compressor ON for a fixed period of time. At the same time, the controller 42 will keep the evaporator fan OFF for a fixed period of time, which will ensure that the freezer compartment is kept cold and the fresh-food compartment does not cool down at the same rate as the freezer compartment, e.g. below the LCL or below the freezing point, because of the evaporator fan being OFF.

If the Duty Cycle Average for the three most recent cycles of the compressor is not below a specific threshold and/or if the temperature of the evaporator's temperature sensor is not above a specific temperature threshold while the compressor is OFF, in Step 116, the controller 42 checks whether the compressor has been OFF for a set period of time. In Step 120, if the evaporator's temperature sensor does not fail and/or if the compressor has not been OFF for a set period of time, the controller 42 continues to calculate and monitor the Compressor Duty Cycle Average, and the algorithm is repeated depending on meeting the different conditions described above.

If the ambient temperature drops faster than the compressor average duty cycle calculation, this will prevent the controller 42 from acquiring three sequential compressor duty cycles. In this situation, the Average Duty Cycle of the compressor will be forced to the threshold value if the compressor has been OFF for a longer time than the compressor runway timeout (for example, 3 hours) and if the evaporator temperature is above the temperature threshold (for example 14 F).

Certain conditions will cause the controller 42 to exit the low ambient mode. For example, if the temperature in the fresh-food compartment increases above the UCL (Step 112), the controller 42 will exit the low ambient mode immediately. If the temperature in the fresh-food compartment does not increase above the UCL (Step 114), the controller 42 will keep the compressor ON for 30 minutes, after which the controller 42 will exit the low ambient mode.

The second control algorithm used for a low ambient condition is a low ambient freezer cooling control with active fresh-food compartment heating control. Because of air leakage and the lack of a damper in the platform, after a certain number of low ambient freezer control cycles, the temperature of the fresh-food compartment would decrease below the LCL, or even below freezing point.

Optionally, to prevent items in the fresh-food compartment from freezing up, a different low ambient control algorithm may be used, during which the fresh-food cavity may be heated up using a heating element. For example, an electric heater, a silicone sheet heater, an incandescent light bulb, or similar heat-emitting elements, as is known in the art, may be used for increasing the temperature inside the fresh-food compartment and prevent freezing of items store therein. The heating element may be controlled by the controller 42 based on a temperature signal transmitted from the fresh-food compartment temperature sensor 56 to the controller. Alternatively, the heating element may have a built-in independent temperature sensor that can sense the temperature in the fresh-food compartment and transmit a temperature signal to the controller 42. The heating element may be activated when the controller 42 determines based on the temperature signal transmitted by the fresh-food compartment temperature sensor 56 or by the built-in independent temperature sensor that the temperature inside the fresh-food compartment is below a certain threshold and may be deactivated when the temperature inside the fresh-food compartment is above a different threshold. The temperature thresholds can be stored in the controller's own memory. Alternatively, the controller 42 can be operatively connected to an external database that may include one or more memory portions (e.g., RAM or ROM).

Figure 6:
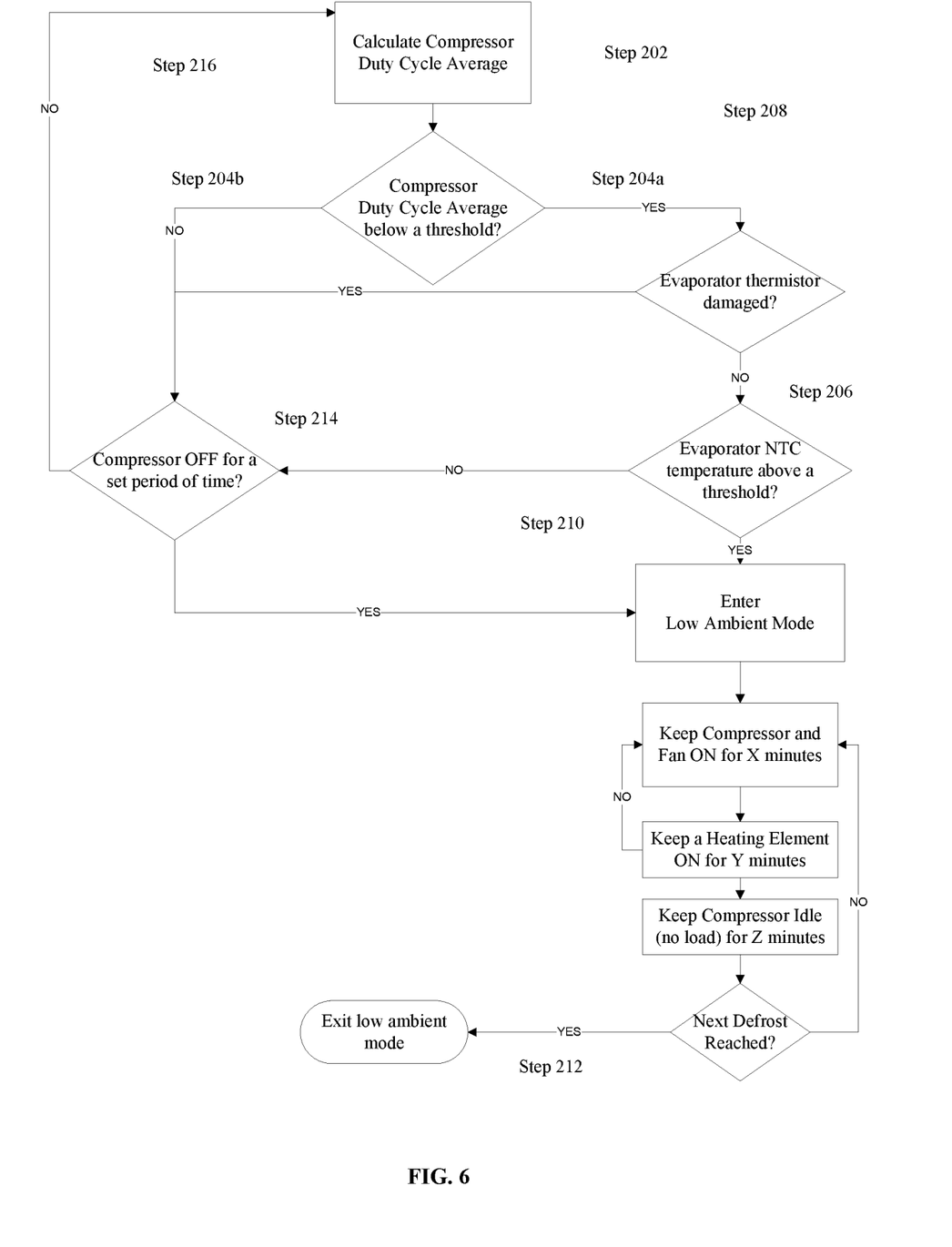
FIG. 6 is a flowchart illustrating a second low ambient freezer cooling control method with active fresh-food compartment heating control.

As illustrated in the flowchart in FIG. 6, the process begins in Step 202, in which the controller 42 calculates the Compressor Duty Cycle Average for the three most recent cycles of the compressor by dividing the time the compressor operates (e.g., Time ON) by the sum of the time the compressor operates and the time the compressor does not operate (e.g., Time ON+Time OFF). If the Duty Cycle Average for the three most recent cycles is below a specific percentage threshold (for example 10%), in Step 204a, the controller 42 checks if the evaporator thermistor has failed. If the evaporator thermistor has not failed, in Step 206, the controller 42 checks if the temperature of the evaporator's temperature sensor is above a specific temperature threshold (for example 14 F), while the compressor is OFF. If the evaporator's temperature sensor has failed, in Step 204b, the controller 42 checks whether the compressor has been OFF for more than the compressor runway timeout (for example 3 hours). If the temperature of the evaporator's temperature sensor is above a specific temperature threshold (Step 206), while the compressor is OFF and/or if the compressor has been has been OFF for more than the compressor runway timeout (Step 210), the controller 42 will start executing the following Low Ambient Cycle algorithm:

First, the controller 42 keeps both the compressor and the fan ON for X minutes (which will keep the freezer compartment from thawing). Second, the controller 42 keeps a heating element ON for Y minutes (which will prevent the fresh-food compartment from freezing). Third, the controller 42 keeps the compressor idle (no loads ON) for Z minutes.

The values of X, Y and Z may be defined or interpolated based on the current fresh-food compartment set point as described in the following look-up table:

|  | Set Point Temperature | | |
| --- | --- | --- | --- |
|  | 33° F. | 39° F. | 45° F. |
| X - Compressor and Fan ON (min) | 10 | 10 | 10 |
| Y - Heating Element (min) | 12 | 14 | 15 |
| Z - Idle (min) | 35 | 40 | 50 |

When using the second control algorithm, the controller 42 will remain in a low ambient mode until the next defrost is reached (Step 212), after which the controller 42 will exit the low ambient mode.

If the Duty Cycle Average for the three most recent cycles of the compressor is not below a specific threshold, and/or if the evaporator temperature sensor has failed, and/or if the temperature of the evaporator's temperature sensor is not above a specific temperature threshold while the compressor is OFF, in Step 214, the controller 42 checks whether the compressor has been OFF for a set period of time. In Step 216, if the compressor has not been OFF for a set period of time, the controller 42 continues to calculate and monitor the Compressor Duty Cycle Average, and the algorithm is repeated depending on meeting the different conditions described above.

The control method of the present invention may be incorporated in the existing control system of the refrigeration appliance.

The present invention provides a control method using a low ambient control algorithm, which solves the problem of freezer thaw in low ambient conditions (between 34 F and 50 F) and prevents the fresh-food compartment from freezing, without using an external heating element, an ambient temperature sensor, or an electronic damper.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be desirable to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method of controlling temperature in cavities of a refrigerator cooled by a refrigeration circuit having a compressor and an evaporator, the method being performed by a controller, and the method comprising the steps of:
   monitoring a duty cycle of the compressor and a temperature of the evaporator;
   calculating an average duty cycle of the duty cycle of the compressor for three most recent consecutive compressor cycles;
   determining whether the average duty cycle is below an average duty cycle threshold;
   determining whether the temperature of the evaporator is above a temperature threshold; and
   if the average duty cycle is below the average duty cycle threshold and if the evaporator temperature is above the temperature threshold, switching on the compressor or keeping the compressor on to effect cooling of at least one of the cavities.

2. The method according to claim 1, wherein the duty cycle of the compressor is calculated by dividing a time the compressor operates by a sum of the time the compressor operates and a time the compressor does not operate.

3. The method according to claim 1, wherein the step of switching on the compressor or keeping the compressor on comprises operating the compressor and an evaporator fan for a first specified time.

4. The method according to claim 1, wherein the step of switching on the compressor or keeping the compressor on comprises operating the compressor for a first specified time and keeping an evaporator fan off.

5. The method according to claim 4, further comprising the steps of:
   determining whether a temperature of a fresh-food compartment is above a predetermined upper temperature value, and
   if the temperature of the fresh-food compartment is not above the predetermined upper temperature value, operating the compressor for a second specified time, wherein the second specified time is longer than the first specified time.

6. The method according to claim 1, wherein the step of switching on the compressor or keeping the compressor on comprises:
   operating the compressor and an evaporator fan for a first specified time;
   heating one of the cavities for a second specified time; and
   keeping the compressor idle for a third specified time.

7. The method according to claim 1, further comprising the steps of:
   checking whether an evaporator thermistor is damaged, and
   if the evaporator thermistor is damaged, turning the compressor off for a predetermined period of time.

8. The method according to claim 7, wherein the evaporator thermistor is determined to be damaged if the temperature of the evaporator cannot be read.

9. The method according to claim 1, further comprising the step of inferring that an ambient temperature is low if the average duty cycle of the compressor is below the average duty cycle threshold and the temperature of the evaporator is above the temperature threshold.

10. The method according to claim 1, further comprising the step of inferring that an ambient temperature is low if the average duty cycle of the compressor is below the average duty cycle threshold.

11. The method according to claim 1, further comprising the step of inferring that an ambient temperature is low if the compressor has been off for a predetermined period of time.

12. The method according to claim 1, wherein the step of determining whether the temperature of the evaporator is above the temperature threshold includes monitoring evaporator temperatures at a plurality of different locations of the evaporator.

13. The method according to claim 1, wherein the step of switching on the compressor or keeping the compressor on includes:
   operating the compressor for a first specified time;
   heating at least one of the cavities for a second specified time;
   idling the refrigeration circuit for a third specified time;
   determining whether the controller indicates that a defrost operation should commence; and
   if the defrost operation should not commence, repeating the steps of operating, heating, and idling.

14. A method of controlling temperature in cavities of a refrigerator cooled by a refrigeration circuit having a compressor and an evaporator, the method being performed by a controller, and the method comprising:
   monitoring a duty cycle of the compressor;
   calculating an average duty cycle of the duty cycle of the compressor for three most recent consecutive compressor cycles;
   determining whether the average duty cycle is below an average duty cycle threshold;
   if the average duty cycle is not below the average duty cycle threshold, determining whether the compressor has been off for a set period of time; and
   if the compressor has been off for a set period of time, switching on the compressor to effect cooling of at least one of the cavities.

15. A refrigeration appliance, comprising:
   a fresh-food compartment;
   a freezer compartment;
   a refrigeration circuit having a compressor and an evaporator;
   a temperature sensor that senses an evaporator temperature and generates a temperature signal based on the evaporator temperature; and
   a controller that receives the temperature signal and determines whether the temperature of the evaporator is above a temperature threshold, calculates an average duty cycle of the compressor, and generates a control signal keeping the compressor on to effect cooling of at least one of the cavities,
   wherein if the average duty cycle is below an average duty cycle threshold and if the evaporator temperature is above the temperature threshold, the controller operates the compressor for a first specified time, heats the fresh-food compartment for a second specified time, and idles the refrigeration circuit for a third specified time.

16. The refrigeration appliance of claim 15, further comprising additional temperature sensors that sense the evaporator temperature at respective different locations of the evaporator and provide respective temperature signals to the controller, wherein the controller controls a defrosting operation based on the respective temperature signals.

17. The refrigeration appliance of claim 15, further comprising a memory that stores the average duty cycle threshold, the temperature threshold, an upper control limit for the fresh-food compartment, the first specified time, the second specified time, and the third specified time.

18. The refrigeration appliance of claim 15, wherein if the average duty cycle is not below the average duty cycle threshold, the controller determines whether the compressor has been off for a set period of time; and if the compressor has been off for a set period of time, the controller keeps the compressor on for the first specified time to effect cooling of at least one of the fresh-food compartment and the freezer compartment.

19. The refrigeration appliance of claim 15, wherein the controller determines whether a defrost operation should commence; and if the defrost operation should not commence, the controller continues to operate the compressor for the first specified time, heat the fresh-food compartment for the second specified time, and idle the refrigeration circuit for the third specified time.

* * * * *